US012699615B2

(12) United States Patent
Agarwal et al.

(10) Patent No.: US 12,699,615 B2
(45) Date of Patent: *Aug. 4, 2026

(54) DISTRIBUTED JOURNAL FOR HIGH PERFORMANCE CONTINUOUS DATA PROTECTION

(71) Applicant: Cohesity, Inc., San Jose, CA (US)

(72) Inventors: Shobhit Agarwal, San Jose, CA (US); Kishan Venkata Sravan Nerella, San Jose, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,031

(22) Filed: Aug. 29, 2024

(65) Prior Publication Data

US 2024/0419529 A1      Dec. 19, 2024

Related U.S. Application Data

(63) Continuation of application No. 17/957,303, filed on Sep. 30, 2022, now Pat. No. 12,079,069.

(51) Int. Cl.
| | |
|---|---|
| *G06F 11/14* | (2026.01) |
| *G06F 11/07* | (2006.01) |
| *G06F 11/1446* | (2026.01) |
| *G06F 11/1471* | (2026.01) |

(52) U.S. Cl.
CPC ...... *G06F 11/0787* (2013.01); *G06F 11/0727* (2013.01); *G06F 11/1451* (2013.01); *G06F 11/1471* (2013.01)

(58) Field of Classification Search
CPC .............. G06F 11/787; G06F 11/0766; G06F 11/0727; G06F 11/1451
See application file for complete search history.

(56) References Cited

U.S. PATENT DOCUMENTS

| | | | |
|---|---|---|---|
| 8,849,764 B1 | 9/2014 | Long et al. | |
| 9,684,563 B1 * | 6/2017 | Wartnick | ............ G06F 11/1458 |
| 10,191,687 B1 | 1/2019 | Baruch et al. | |
| 10,467,102 B1 | 11/2019 | Baruch et al. | |
| 12,079,069 B2 | 9/2024 | Agarwal et al. | |
| 2016/0162369 A1 * | 6/2016 | Ahn | .................... G06F 11/1461 |
| | | | 707/654 |
| 2017/0102998 A1 * | 4/2017 | Bavishi | .............. G06F 11/1464 |
| 2019/0332692 A1 | 10/2019 | Rachapudi et al. | |
| 2020/0285542 A1 * | 9/2020 | Deshpande | ......... G06F 11/1451 |
| 2021/0357293 A1 * | 11/2021 | Mathew | ................ G06F 16/215 |
| 2022/0027338 A1 * | 1/2022 | Jo | ......................... G06F 16/214 |

(Continued)

OTHER PUBLICATIONS

Communication pursuant to Article 94(3) EPC from counterpart European Application No. 23200415.0 dated Apr. 9, 2025, 7 pp.

(Continued)

*Primary Examiner* — Yolanda L Wilson

(74) *Attorney, Agent, or Firm* — Shumaker & Sieffert, P.A.

(57) ABSTRACT

A set of data changes to a storage associated with a source system is received. One or more data logs among a plurality of data logs stored in different nodes of a storage system is dynamically selected based at least in part on a dynamic analysis of metrics of the different nodes of the storage system. The at least one data change of the set of data changes are logged in the one or more selected data logs.

20 Claims, 6 Drawing Sheets

300 ⟍

(56)                    References Cited

U.S. PATENT DOCUMENTS

2022/0179748 A1 *   6/2022   Agarwal ............. G06F 11/1456
2023/0385159 A1 *   11/2023  Kuchibhotla ....... G06F 11/1469

OTHER PUBLICATIONS

Response to Extended Search Report dated Mar. 28, 2024, from counterpart European Application No. 23200415.0 filed Oct. 31, 2024, 20 pp.
Extended Search Report from counterpart European Application No. 23200415.0 dated Mar. 28, 2024, 8 pp.
Prosecution History from U.S. Appl. No. 17/957,303, now issued U.S. Pat. No. 12,079,069, dated Feb. 29, 2024 through May 1, 2024, 19 pp.
Notice of Intent to Grant and Text Intended to Grant from counterpart European Application No. 23200415.0 dated Sep. 17, 2025, 84 pp.
Response to Communication pursuant to Article 94(3) EPC dated Apr. 9, 2025, from counterpart European Application No. 23200415.0 filed Aug. 6, 2025, 16 pp.

* cited by examiner

200

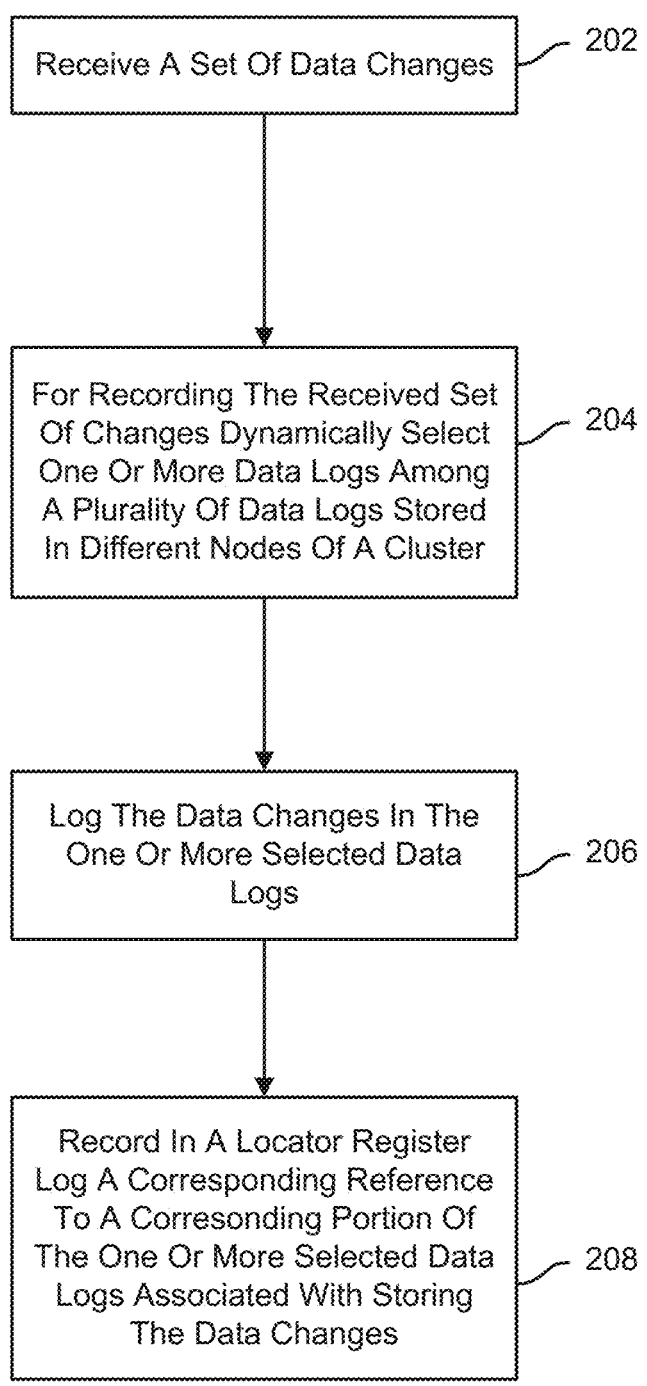

Receive A Set Of Data Changes — 202

For Recording The Received Set Of Changes Dynamically Select One Or More Data Logs Among A Plurality Of Data Logs Stored In Different Nodes Of A Cluster — 204

Log The Data Changes In The One Or More Selected Data Logs — 206

Record In A Locator Register Log A Corresponding Reference To A Corresonding Portion Of The One Or More Selected Data Logs Associated With Storing The Data Changes — 208

Receive A Set Or A Subset Of Data Changes — 552

Log The Received Set Of Data Changes In A Data Log Associated With The Node — 554

Record In A Locator Register Log A Reference To A Portion Of The Data Log Associated With The Node Storing The Received Set Or Subset Of Data Changes — 556

DISTRIBUTED JOURNAL FOR HIGH PERFORMANCE CONTINUOUS DATA PROTECTION

This application is a continuation of U.S. patent application Ser. No. 17/957,303, filed Sep. 30, 2022, "DISTRIBUTED JOURNAL FOR HIGH PERFORMANCE CONTINUOUS DATA PROTECTION", the entire content of which is incorporated herein by reference.

BACKGROUND

A primary system may backup one or more objects to a storage system. A user associated with the source system may specify a recovery point objective (RPO) and a recovery time objective (RTO). RPO is a measure of the acceptable amount of data loss for the one or more objects after a disruption of the source system. RTO is a measure of how fast the one or more objects need to be back online after the disruption.

The user associated with the source system may specify a near-zero RPO. For low change rate objects (e.g., objects having a change rate below a threshold), the storage system can provide CDP to satisfy the specified RPO. The storage system may log the changes associated with the workload in a data log. However, for high change rate objects, the data change rate may exceed the rate at which the storage system is capable of writing data to the data log. As a result, the storage system becomes a bottleneck and may be unable to provide CDP that satisfies the specified RPO.

BRIEF DESCRIPTION OF THE DRAWINGS

Various embodiments of the invention are disclosed in the following detailed description and the accompanying drawings.

FIG. 2 is a flow diagram illustrating a process for providing continuous data protection in accordance with some embodiments.

DETAILED DESCRIPTION

Figure 1:
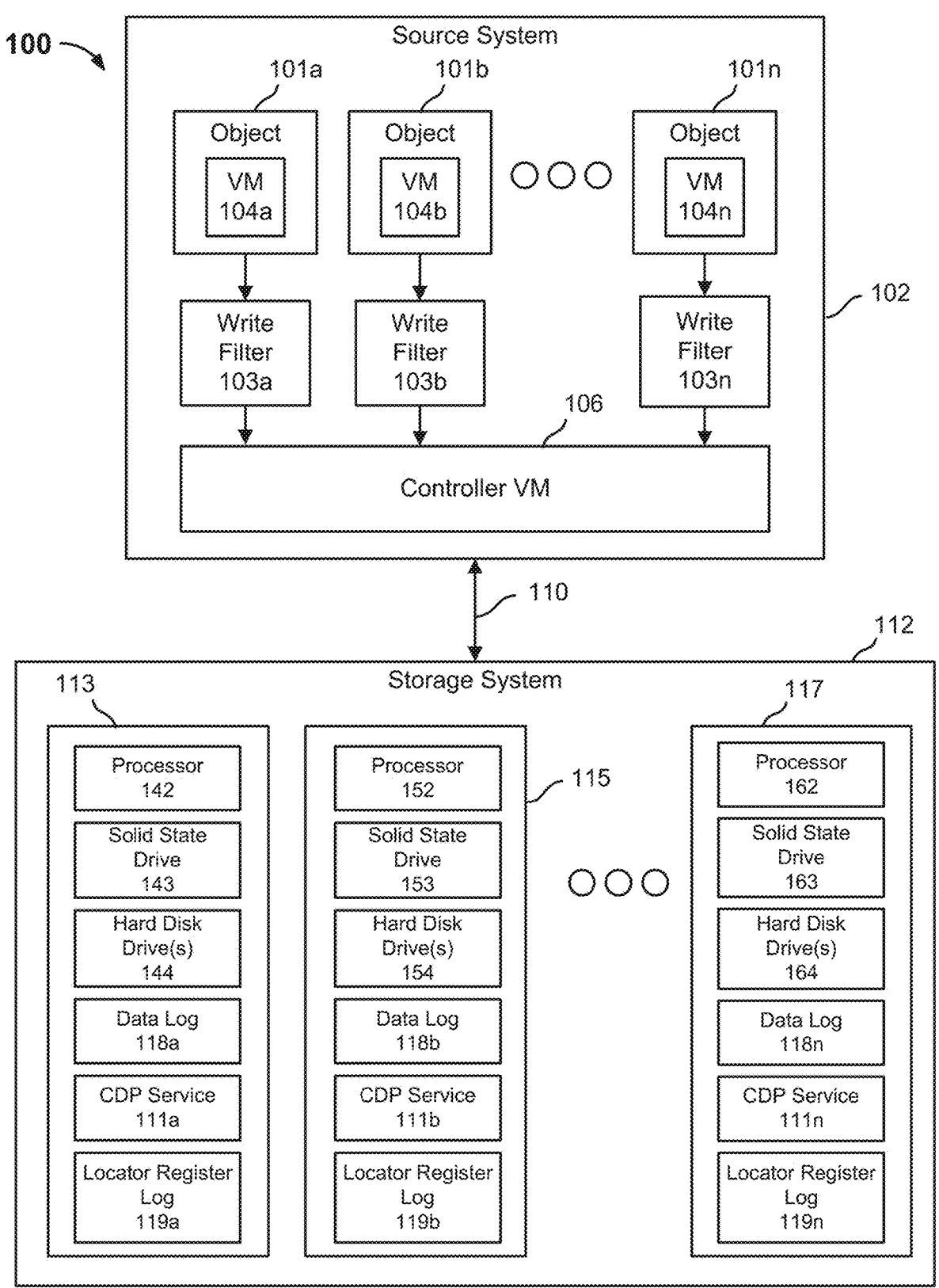
FIG. 1 is a block diagram illustrating a system for providing continuous data protection in accordance with some embodiments.

A source system may host one or more objects (e.g., virtual machine (VM), database, applications, etc.). A storage system may be configured to provide CDP for the source system by providing a write filter for each of the one or more objects. A write filter is configured to intercept all input/outputs (IOs) of an associated object, filter out the read IOs, and attach a sequence number to each intercepted write IO (referred to as a "data change" herein).

The sequence number may include an incarnation ID and a change ID. The incarnation ID may indicate an incarnation of the write filter and may be incremented each time the write filter is restarted after a crash (e.g., object crash, filter crash). The change ID may be incremented for each data change.

A write filter is configured to provide a stream of data changes (e.g., changes to metadata or data content) to a controller VM associated with the source system. Each data change included in the stream of data changes is sequential, that is, a data change included has a sequence number that is greater than the sequence number associated with a previous data change included in the set. The controller VM is configured to provide the data changes to a CDP service running on a first node of a plurality of nodes associated with the storage system. In some embodiments, the first node is capable of ingesting the set of data changes at a particular rate and logging the set of data changes in its data log in a manner that enables a specified RPO and/or RTO to be satisfied. For example, a size of the set of data changes may be 100 MB, the first node is capable of logging the data changes at a rate of 100 MB/s based on current metrics of the first node (e.g., ingest queue length, CPU utilization), and a specified RPO is 1 second. In some embodiments, the first node is not capable of ingesting the set of data changes at a particular rate and/or logging the set of data changes in its data log in a manner that enables the specified RPO and/or RTO to be satisfied. For example, a size of the set of data changes may be 1 GB, the first node is capable of logging the data changes at a rate of 100 MB/s based on the current metrics of the first node, and a specified RPO may be 1 second. In this example, at least 10 seconds are needed to log the data changes to the selected data log. For a high change rate object where the first node may continue to receive one or more additional sets of data changes, the first node may store the one or more additional sets of data changes in a buffer of the first node. However, the first node may become a bottleneck as one or more sets of data changes accumulate and prevent the specified RPO and/or RTO from being satisfied.

Techniques to prevent a node of the storage system from becoming a bottleneck when providing CDP for a high change rate object associated with a source system are disclosed. Although the techniques are described with respect to CDP, the techniques disclosed herein may be applicable whenever a data management operation (e.g., backup, migration, replication, archive, etc.) is performed for a cohort of data that is provided from a first system to a second system.

In a first technique, the controller VM associated with a source system accumulates the stream of data changes of an object associated with the source system and provides sets of data changes (e.g., batches) to a CDP service running on a first node of a plurality of nodes associated with the storage system. Each of the plurality of nodes is running a corresponding CDP service. The controller VM is configured to provide the data changes to any of the nodes associated with the storage system. The first node is coupled to the other node(s) associated with the storage system. The first node and each of the other node(s) include a corresponding data log (e.g., a journal) capable of storing data changes. The process described below may be repeated each time the CDP service associated with the first node receives a set of data changes from the controller VM. A first set of data changes may correspond to a first epoch, a second set of data changes may correspond to a second epoch, . . . , and an nth set of data changes may correspond to an nth epoch.

Each time the CDP service associated with the first node receives a set of data changes, the CDP service associated with the first node analyzes one or more metrics of a plurality of nodes associated with the storage system and dynamically selects for recording the received set of data changes on one or more data logs among a plurality of data logs stored in the plurality of nodes associated with the storage system based at least in part on a dynamic analysis of metrics of the plurality of nodes associated with the storage system.

In some embodiments, the CDP service associated with the first node dynamically selects a single data log (e.g., the data log associated with the first node) based at least in part on a dynamic analysis of metrics of the plurality of nodes. The dynamic analysis may indicate that the first node is individually capable of ingesting the set of data changes at a particular rate and logging the data changes included in the set in a manner that meets the specified RPO and/or RTO. The metrics of the different nodes associated with the storage system may include ingest queue length, CPU utilization, etc. The metrics associated with a node influence a rate at which the node is capable of logging a set of data changes. In response to such a determination, the CDP service associated with the first node logs in the data log associated with the first node the set of data changes. Subsequently, the CDP service associated with the first node records in a locator register log a reference to a portion of the data log associated with the first node storing the received set of data changes.

In some embodiments, the locator register log is located at a single node of the storage system. In some embodiments, the locator register log is a distributed log shared between the nodes of the storage system.

In some embodiments, the CDP service associated with the first node determines that the first node is not individually capable of ingesting the set of data changes at a particular rate and/or logging the data changes included in the set in a manner that meets the specified RPO and/or RTO. In response to such a determination, the CDP service associated with the first node dynamically selects a plurality of data logs associated with a plurality of nodes based at least in part on a dynamic analysis of metrics of the plurality of nodes associated with the storage system, divides the set of changes into a plurality of subsets, and logs, in parallel, a corresponding subset of data changes in a corresponding selected data log associated with the plurality of nodes. After logging a corresponding subset of data changes in a selected data log, the CDP service associated with the first node records in a locator register log a reference to a portion of the selected data log associated with the node storing the corresponding subset of data changes. The parallel ingestion of data changes may prevent a single node from becoming overloaded with logging data changes and becoming a bottleneck.

Each data change included in a set or subset of data changes is associated with a corresponding sequence number. In some embodiments, a second node finishes logging a second set or subset of data changes (e.g., data changes 51-100) before a first node finishes logging a first set or subset of data changes (e.g., data changes 1-50). The CDP service associated with the second node may provide the CDP service associated with the first node an indication to update the locator register log because the second node has finished logging the second set or subset of data changes. In response to receiving the indication, the first node may perform a check before updating the locator register log and prevent the locator register log from being updated with data changes that are out-of-sequence (e.g., logging data changes 51-100 before logging data changes 1-50). A data change is consistent if a sequence number associated with the data change is in-sequence with respect to a previous data change. A data change is inconsistent if the sequence number associated with the data change is out-of-sequence with respect to a previous data change. The first node may determine whether the update associated with the second node is a consistent update. In response to a determination that the update is a consistent update, the CDP service associated with the first node updates the locator register log. In response to a determination that the update is an inconsistent update, the CDP service associated with the first node stores the update in a buffer associated with the first node. This ensures that the locator register log is consistent in the event any of the nodes go offline before the locator register log is updated. For example, the locator register log is consistent if data changes 1-50 are logged, data changes 51-68 are logged, and then the first node goes offline. However, the locator register log is inconsistent if data changes 51-100 are logged and then the second node goes offline. In this example, locator register log would be missing entries for data changes 0-50. A consistent locator register log is needed to restore the object to any point in time for which there is an associated data change. The CDP service associated with the first node may update the locator register log at a later point in time at which the locator register log update associated with the second node becomes a consistent update.

In a second technique, the controller VM associated with the source system accumulates the stream of data changes associated with an object into a set of data changes, analyzes one or more metrics of a plurality of nodes associated with the storage system, and determines whether any of the nodes associated with the storage system is individually capable of ingesting the set of data changes at a particular rate and logging the data changes included in the set in a manner that meets the specified RPO and/or RTO. The process described below may be repeated each time the controller VM accumulates a set of data changes. A first set of data changes may correspond to a first epoch, a second set of data changes may correspond to a second epoch, . . . , and an nth set of data changes may correspond to an nth epoch.

The controller VM associated with the source system dynamically selects for recording the received set of data changes on one or more data logs among a plurality of data logs stored in the plurality of nodes associated with the storage system based at least in part on a dynamic analysis of metrics of the plurality of nodes associated with the storage system. In some embodiments, the controller VM associated with the source system dynamically selects the data log associated with a single node because the single node is capable of ingesting the set of data changes at a particular rate and logging the data changes in a manner that enables the specified RPO and/or RTO to be satisfied and provides the received set of data changes to the single node associated with the selected data log. In response, the CDP service associated with the single node ingests the set of data changes and logs in the selected data log associated with the single node the set of data changes. After logging the received set of data changes in the selected data log, the CDP service associated with the single node records in a locator register log a reference to a portion of the selected data log associated with the single node storing the received set of data changes.

In some embodiments, the controller VM associated with the source system dynamically selects a plurality of data logs associated with a plurality of nodes based at least in part on a dynamic analysis of metrics of the plurality of nodes associated with the storage system, divides the set of changes into a plurality of subsets because a single node is not capable of ingesting the set of data changes at a particular rate and/or logging the data changes in a manner that enables the specified RPO and/or RTO to be satisfied, and provides a corresponding subset to each of the nodes associated with the selected data logs. The plurality of subsets are associated with the same epoch. In response, a CDP service of a node associated with a selected data log, in parallel with the other CDP services of the other nodes, ingests the corresponding subset of data changes and logs in the selected data log the corresponding subset of data changes. After logging the corresponding subset of data changes in the selected data log, the CDP service of a node associated with the selected data log records in a locator register log a reference to a portion of the selected data log associated with the node storing the subset of data changes. The parallel ingestion of data changes may prevent a single node from becoming overloaded with logging data changes and becoming a bottleneck.

FIG. 1 is a block diagram illustrating a system for providing continuous data protection in accordance with some embodiments. In the example shown, system 100 includes a source system 102 coupled to storage system 112 via connection 110. Connection 110 may be a wired connection or a wireless connection. Connection 110 may be a local area network (LAN), a wireless area network (WAN), an intranet, the Internet, and/or a combination thereof.

Source system 102 is comprised of a first object 101a, a second object 101b, . . . , and an nth object 101n. Each object may be a different VM. Although FIG. 1 depicts an object as a VM, source system 102 may host different objects, such as a database, an application, a container, a pod, etc.

CDP is enabled for objects 101a, 101b, . . . , 101n. To enable CDP for an object, a write filter is attached to an object. The write filter may be attached at a disk layer of the object (e.g., disk write filter), a file system layer of the object (e.g., file system write filter), or a virtualized layer of the object (e.g., virtualized write filter). An object may be associated with one or more disks. A corresponding write filter may be attached to each of the one or more disks. A disk may be associated with one or more write filters.

In the example, object 101a is associated with write filter 103a, object 101b is associated with write filter 103b, . . . , and object 101n is associated with write filter 103n. A write filter is configured to intercept all IOs of an associated CDP-enabled object, filter out the read Ios, and provide a stream of the data changes to controller VM 106. A write filter is configured to attach a sequence number to each intercepted write IO.

The sequence number may include an incarnation ID and a change ID. In some embodiments, the incarnation ID indicates an incarnation of the write filter and is incremented each time the write filter is restarted after a crash (e.g., object crash, filter crash). In some embodiments, the incarnation ID is not incremented after a clean restart of an object. The change ID is incremented for each intercepted write IO. For example, the sequence number may be represented as [incarnation ID, change ID]. The sequence number may be [0, 0], [0, 1] . . . [0, n]. In the event the write filter goes offline after a crash and comes back online, the incarnation ID may be incremented such that the sequence numbers attached to the intercepted write Ios may be [1, 0], [1, 1] . . . [1,n].

Storage system 112 includes a first node 113, second node 115, a third node 117, . . . , and an nth node 117. In some embodiments, the nodes 113, 115, . . . , 117 are homogenous nodes where each node has the same capabilities (e.g., processing, storage, memory, etc.). In some embodiments, at least one of the nodes 113, 115, . . . , 117 is a heterogeneous node with different capabilities (e.g., processing, storage, memory, etc.) than the other nodes of storage system 112.

In some embodiments, each node has a corresponding processor, a corresponding CDP service, and a plurality of storage tiers. A first storage tier may correspond to a storage with faster access times than a second storage tier. In the example shown, a first storage tier corresponds to a solid state drive and a second storage tier corresponds to a hard disk drive.

In some embodiments, a node of storage system 112 includes a processor, memory, and a plurality of storage devices. The plurality of storage devices may include one or more solid state drives, one or more hard disk drives, or a combination thereof. In the example shown, nodes 113, 115, . . . , 117 include respective processors 142, 152, . . . , 162, respective solid state drives 143, 153, . . . , 163, respective hard disk drives 144, 154, . . . , 164, and respective CDP services 145, 155, . . . , 165.

In some embodiments, a node of storage system 112 includes a processor and memory, and is coupled to a separate storage device. The separate storage device may include one or more storage devices (e.g., flash storage devices). A storage device may be segmented into a plurality of partitions. Each of the nodes 113, 115, . . . , 117 may be allocated one or more of the partitions. The one or more partitions allocated to a node may be configured to store data associated with some or all of the plurality of objects that were backed up to storage system 112. For example, the separate storage device may be segmented into 10 partitions and storage system 112 may include 10 nodes. A node of the 10 nodes may be allocated one of the 10 partitions.

In some embodiments, a node of storage system 112 includes a processor, memory, and a storage device. The node may be coupled to a separate storage device. The separate storage device may include one or more storage devices. A storage device may be segmented into a plurality of partitions. Each of the nodes 113, 115, . . . , 117 may be allocated one or more of the partitions. The one or more partitions allocated to a node may be configured to store data associated with some or all of the plurality of objects that were backed up to storage system 112. For example, the separate storage device may be segmented into 10 partitions and storage system 112 may include 10 nodes. A node of the 10 nodes may be allocated one of the 10 partitions.

Storage system 112 may be a cloud instantiation of a storage system. A configuration of the cloud instantiation of storage system 112 may be a virtual replica of storage system 112. For example, storage system 112 may be comprised of three cluster nodes, each cluster node with a storage capacity of 10 TB. A cloud instantiation of storage system 112 may be comprised of three virtual nodes, each virtual node with a storage capacity of 10 TB. In other embodiments, a cloud instantiation of storage system 112 may have more storage capacity than an on-premises instantiation of storage system 112. In other embodiments, a cloud instantiation of storage system 112 may have less storage capacity than an on-premises instantiation of storage system 112.

In a first technique, controller VM 106 is configured to accumulate a stream of data changes associated with an object, such as objects 101a, 101b, . . . , 101n, and provide one or more sets of data changes (e.g., one or more batches of data changes) to a CDP service associated with one of the nodes 113, 115, . . . , 117. Controller VM 106 is configured to provide the one or more sets of data changes to any of CDP services 111a, 111b, . . . , 111n. Each set of data changes may correspond to a different epoch. Nodes 113, 115, . . . , 117 are coupled to each other via an internal network associated with storage system 112. Nodes 113, 115, . . . , 117 each include a corresponding data log 118a, 118b, . . . , 118n (e.g., a journal) capable of storing data changes. In some embodiments, the data log is a distributed data log. A data change included in the set of data changes is comprised of a plurality of data chunks that are stored across the nodes 113, 115, . . . , 117.

Each time a CDP service receives a set of data changes, the CDP service analyzes one or more metrics associated with nodes 113, 115, . . . , 117 and dynamically selects for recording the received set of data changes on one or more data logs among a plurality of data logs 118a, 118b, . . . , 118n based at least in part on a dynamic analysis of metrics of the plurality of nodes 113, 115, . . . , 117.

In some embodiments, the CDP service dynamically selects a single data log based at least in part on a dynamic analysis of metrics of the plurality of nodes 113, 115, . . . , 117. The dynamic analysis may indicate that the node with which the CDP is associated is individually capable of ingesting the set of data changes at a particular rate and logging the data changes included in the set in a manner that meets the specified RPO and/or RTO. The metrics of nodes 113, 115, . . . , 117 may include ingest queue length, CPU utilization, etc. An ingest queue length may be measured based on the number of bytes in the queue, a time required to ingest the bytes in the queue, a number of times in the queue, a size of the items in the queue, etc. The metrics associated with a node influence a rate at which the node is capable of logging a set of data changes. In response to such a determination that the CDP service logs in the data log associated with the node the set of data changes. Subsequently, the CDP service records in a corresponding locator register log 119a, 119b, . . . , 119n a reference to a portion of the data log associated with the node storing the received set of data changes.

In some embodiments, the locator register log is a distributed log (i.e., locator register log 119a, 119b, . . . , 119n) shared between the nodes of storage system 112. In some embodiments, the locator register log is located at one of the nodes 113, 115, . . . , 117. The locator register log may be stored in a solid state drive or a hard disk drive associated with a node. A data log may be stored in a solid state drive or a hard disk drive associated with a node.

In some embodiments, the CDP service (e.g., CDP service 111a) determines that the node with which the CDP service is associated (e.g., node 113) is not individually capable of ingesting the set of data changes at a particular rate and/or logging the data changes included in the set in a manner that meets the specified RPO and/or RTO. In response to such a determination, the CDP service (e.g., CDP service 111a) dynamically selects a plurality of data logs associated with the plurality of nodes 113, 115, . . . , 117 based at least in part on a dynamic analysis of metrics of the plurality of nodes 113, 115, . . . , 117, divides the set of changes into a plurality of subsets, and logs, in parallel, a corresponding subset of data changes in a corresponding selected data log associated with the plurality of nodes 113, 115, . . . , 117. In some embodiments, some of the data logs 118a, 118b, . . . , 118n are selected. In some embodiments, all of the data logs 118a, 118b, . . . , 118n are selected. In some embodiments, the selected data logs includes the data log stored on a node with which the CDP service is associated. In some embodiments, the selected data logs exclude the data log stored on a node with which the CDP service is associated. After logging a corresponding subset of data changes in one of the selected data logs, the CDP service (e.g., CDP service 111a) records in a locator register log (e.g., locator register log 119a) a reference to a portion of the selected data log associated with the node storing the corresponding subset of data changes. The parallel ingestion of data changes may prevent a single node from becoming overloaded with logging data changes and becoming a bottleneck.

Each data change included in a set or subset of data changes is associated with a corresponding sequence number. In some embodiments, a second node (e.g., node 115) finishes logging a second set or subset of data changes (e.g., data changes 51-100) before a first node (e.g., node 113) finishes logging a first set or subset of data changes (e.g., data changes 1-50). The CDP service associated with the second node (e.g., CDP service 111b) may provide the CDP service associated with the first node (e.g., CDP service 111a) an indication to update the locator register log because the second node has finished logging the second set or subset of data changes. In response to receiving the indication, the first node may perform a check before updating the locator register log (e.g., locator register log 119b) and prevent the locator register log from being updated with data changes that are out-of-sequence (e.g., logging data changes 51-100 before logging data changes 1-50). A data change is consistent if a sequence number associated with the data change is in-sequence with respect to a previous data change. A data change is inconsistent if the sequence number associated with the data change is out-of-sequence with respect to a previous data change. The first node may determine whether the update is a consistent update. In response to a determination that the update is a consistent update, the CDP service associated with the first node updates the locator register log. In response to a determination that the update is an inconsistent update, the CDP service associated with the first node stores the update in a buffer associated with the first node. This ensures that the locator register log is consistent in the event any of the nodes go offline before the locator register log is updated. For example, the locator register log is consistent if data changes 1-50 are logged, data changes 51-68 are logged, and then the first node goes offline. However, the locator register log is inconsistent if data changes 51-100 are logged and then the second node goes offline. In this example, locator register log would be missing entries for data changes 0-50. A consistent locator register log is needed to restore the object to any point in time for which there is an associated data change. The CDP service associated with the first node may update the locator register log at a later point in time at which the locator register log update associated with the second node becomes a consistent update.

In some embodiments, the CDP service (e.g., CDP service 111a) dynamically selects the data log associated with a different node (e.g., node 115, . . . , 117) based at least in part on a dynamic analysis of metrics of the different node and logs in the data log associated with the different node the set of data changes. In some embodiments, at least two of the nodes associated with storage system 112 are capable of ingesting the set of data changes at a particular rate and logging the set of data changes in a manner that satisfies a specified RPO and/or RTO. In such embodiments, the CDP service selects one of the data logs and logs the set of changes in the selected data log.

In a second technique, controller VM 106 accumulates the stream of data changes associated with an object, such as objects 101a, 101b, . . . , 101n into a set of data changes, analyzes one or more metrics of a plurality of nodes 113, 115, . . . , 117, and determines whether any of the nodes 113, 115, . . . , 117 is individually capable of ingesting the set of data changes at a particular rate and logging the data changes included in the set in a manner that meets the specified RPO and/or RTO. The process described below may be repeated each time controller VM 106 accumulates a set of data changes. Each set of data changes may correspond to a different epoch.

Controller VM 106 dynamically selects for recording the received set of data changes on one or more data logs among a plurality of data logs 118a, 118b, . . . , 118n based at least in part on a dynamic analysis of metrics of the plurality of nodes 113, 115, . . . , 117. In some embodiments, controller VM 106 dynamically selects the data log associated with a single node (e.g., node 113) and provides the received set of data changes to the single node associated with the selected data log. In response, the CDP service associated with the single node (e.g., CDP service 111a) ingests the set of data changes and logs the set of data changes in the selected data log associated with the single node. After logging the received set of data changes in the selected data log, the single node records in a locator register log (e.g., locator register log 119a) a reference to a portion of the selected data log associated with the single node storing the received set of data changes.

In some embodiments, controller VM 106 dynamically selects a plurality of data logs associated with a plurality of nodes 113, 115, . . . , 117 based at least in part on a dynamic analysis of metrics of the plurality of nodes 113, 115, . . . , 117, divides the set of changes into a plurality of subsets, and provides a corresponding subset to each of the nodes associated with the selected data logs. In some embodiments, some of the data logs 118a, 118b, . . . , 118n are selected. In some embodiments, all of the data logs 118a, 118b, . . . , 118n are selected. In response, a node associated with a selected data log (e.g., node 113), in parallel, ingests the corresponding subset of data changes and logs in the selected data log the corresponding subset of data changes. After logging the corresponding subset of data changes in the selected data log, the node associated with the selected data log records in a locator register log (e.g., locator register log 119a) a reference to a portion of the selected data log associated with the node storing the subset of data changes. The parallel ingestion of data changes may prevent a single node from becoming overloaded with logging data changes and becoming a bottleneck.

FIG. 2 is a flow diagram illustrating a process for providing continuous data protection in accordance with some embodiments. In the example shown, process 200 may be implemented by a storage system, such as storage system 112.

At 202, a set of data changes is received. The set of data changes are associated with an epoch. The set of data changes include a plurality of data changes, each having a corresponding sequence number (e.g., data changes 1-50). The sequence numbers in the set of data changes are sequential. The set of data changes corresponds to one or more write I/Os associated with an object (e.g., VM, database, applications, etc.). The set of data changes may include an associated entity identifier. The associated entity identifier may indicate the object with which the set of data changes is associated (e.g., a VMDK associated with a VM). A data change included in the set of data changes may be a key-value pair. The key may be the entity identifier and the value may be a sequence number. The sequence number is associated with a corresponding write I/O.

At 204, one or more data logs among a plurality of data logs stored in different nodes of a storage system are dynamically selected for recording the received set of data changes. The one or more data logs are selected at least in part on a dynamic analysis of metrics of the different nodes of the storage system. The metrics of the different nodes associated with the storage system may include ingest queue length, CPU utilization, etc. The CDP service generates a corresponding reference to a corresponding portion of the one or more selected data logs associated with storing the data changes.

A CDP service associated with a first node receiving the set of changes analyzes the one or more metrics of a plurality of nodes associated with the storage system and determines whether the first node is individually capable of ingesting the set of data changes at a particular rate and logging the data changes included in the set in a manner that meets the specified RPO and/or RTO.

In some embodiments, the CDP service associated with the first node determines that the first node is individually capable of ingesting the set of data changes at a particular rate and logging the data changes included in the set in a manner that meets the specified RPO and/or RTO and selects the data log associated with the first log for recording the received set of changes.

In some embodiments, the CDP service associated with the first node determines that the first node is not individually capable of ingesting the set of data changes at a particular rate and/or logging the data changes included in the set in a manner that meets the specified RPO and/or RTO. In response to such a determination, the CDP service associated with the first node dynamically selects for recording the received set of data changes a plurality of data logs stored in some or all of the plurality of nodes associated with the storage system based at least in part on a dynamic analysis of metrics of the plurality of nodes associated with the storage system. In some embodiments, the selected data logs include the data log stored on the first node. In some embodiments, the selected data logs exclude data log stored on the first node.

At 206, the data changes are logged in the one or more selected data logs. The data changes are logged at corresponding portion of the one or more selected data logs. A data log associated with a node may log a sequence number with a corresponding data change. In some embodiments, a set of data changes is stored in a data log. The data log may include an entry for each data change included in the set of data changes. In some embodiments, a subset of data changes is stored in a data log. The data log may include an entry for each data change included in the subset of data changes.

At 208, a corresponding reference to a corresponding portion of the one or more selected data logs associated with storing the data changes is recorded in a locator register log.

In some embodiments, the set of data changes is stored in a data log associated with a single node. An entry in the locator register log may map a data log associated with the single node (e.g., a shard), a file offset within the data log, and a shard size with sequence numbers of data changes included in the set.

In some embodiments, the set of data changes was divided into a plurality of subsets and stored in a corresponding data log associated with a plurality of nodes. An entry in the locator register log may map a data log associated with the one of the nodes (e.g., a shard), a file offset, and a shard size with the one of the nodes with sequence numbers of data changes included in the subset.

Figure 3:
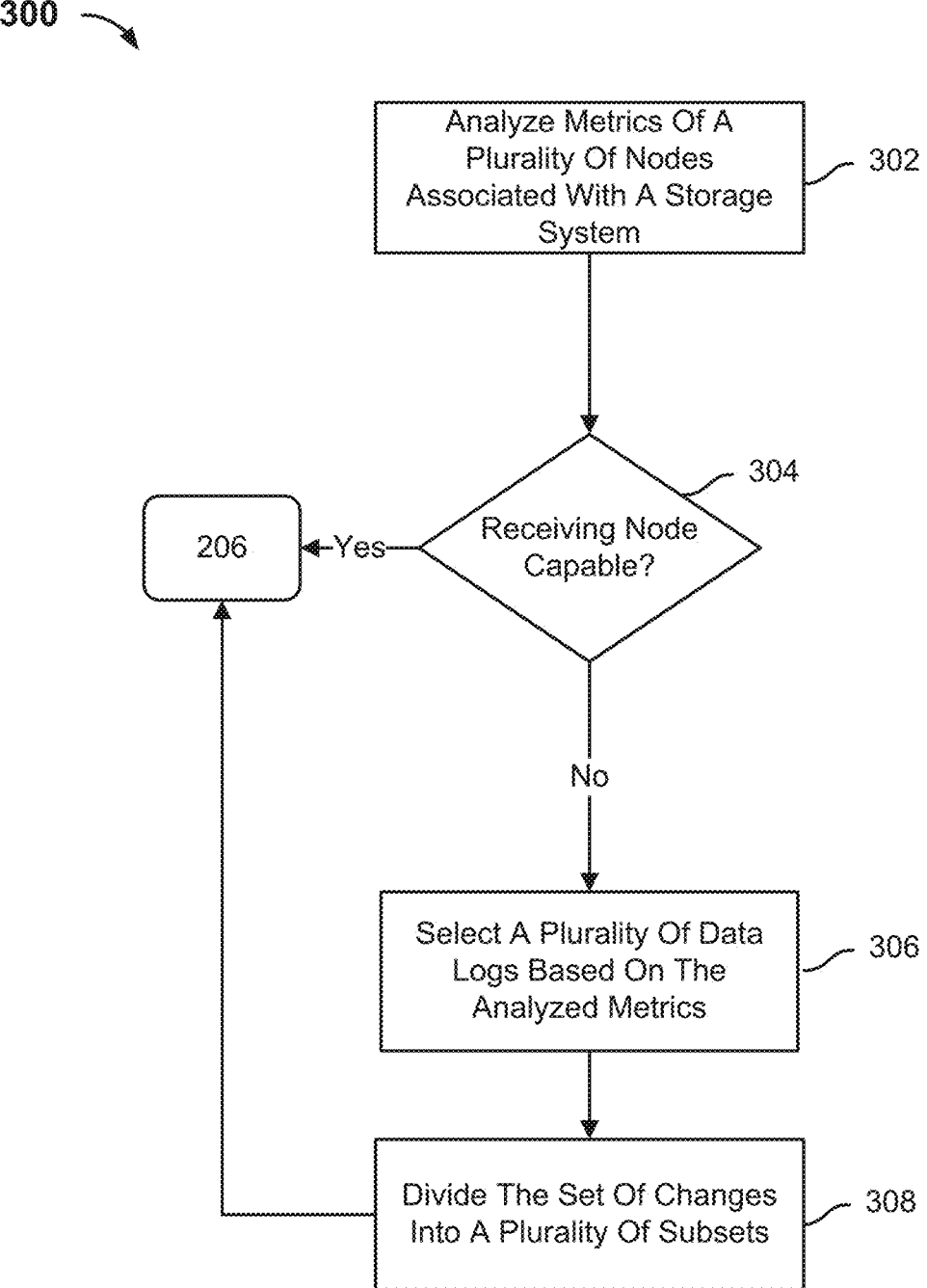
FIG. 3 is a flow diagram illustrating a process for dynamically selecting one or more data logs in accordance with some embodiments.

FIG. 3 is a flow diagram illustrating a process for dynamically selecting one or more data logs in accordance with some embodiments. In the example shown, process 300 may be implemented by a CDP service, such as CDP services 111a, 111b, . . . , 111n. In some embodiments, process 300 is implemented to perform some or all of step 204 of process 200.

At 302, metrics of a plurality of nodes associated with a storage system are analyzed. The metrics of the different nodes associated with the storage system may include ingest queue length, CPU utilization, etc.

At 304, it is determined whether a node receiving a set of changes is capable of ingesting the set of data changes at a particular rate and/or logging the set of data changes in a manner that satisfies a specified RPO and/or RTO. In response to a determination that the specified RPO and/or RTO is able to be satisfied by the node receiving the set of changes, the log of the receiving node is selected and process 300 proceeds to 206. For example, a size of the set of data changes may be 100 MB, the receiving node is capable of logging the data changes at a rate of 100 MB/s based on the current metrics of the node, and a specified RPO is 1 second.

In response to a determination that the RPO and/or RTO is unable to be satisfied by the receiving node, process 300 proceeds to 306. For example, a size of the set of data changes may be 1 GB, the node is capable of logging the data changes at a rate of 100 MB/s based on the current metrics of the node, and a specified RPO may be 1 second. In this example, the node needs at least 10 seconds to log the data changes to the data log associated with the node. For a high change rate object where the node may continue to receive one or more additional sets of data changes, the node may become a bottleneck when logging the data changes and prevent the specified RPO and/or RTO from being satisfied.

At 306, a plurality of logs associated with a plurality of nodes are selected based on the analyzed metrics. In some embodiments, some of the data logs associated with the plurality of nodes are selected. In some embodiments, all of the data logs associated with the plurality of nodes are selected. In some embodiments, the selected data logs include the data log stored on the receiving node. In some embodiments, the selected data logs exclude the data log stored on the receiving node.

At 308, the set of changes is divided into a plurality of subsets. In some embodiments, the number of subsets is equal to the number of nodes associated with the storage system. In some embodiments, the number of subsets is less than the number of nodes associated with the storage system. In some embodiments, the number of subsets is the number of subsets needed to satisfy the specified RPO and/or RTO.

Figure 4:
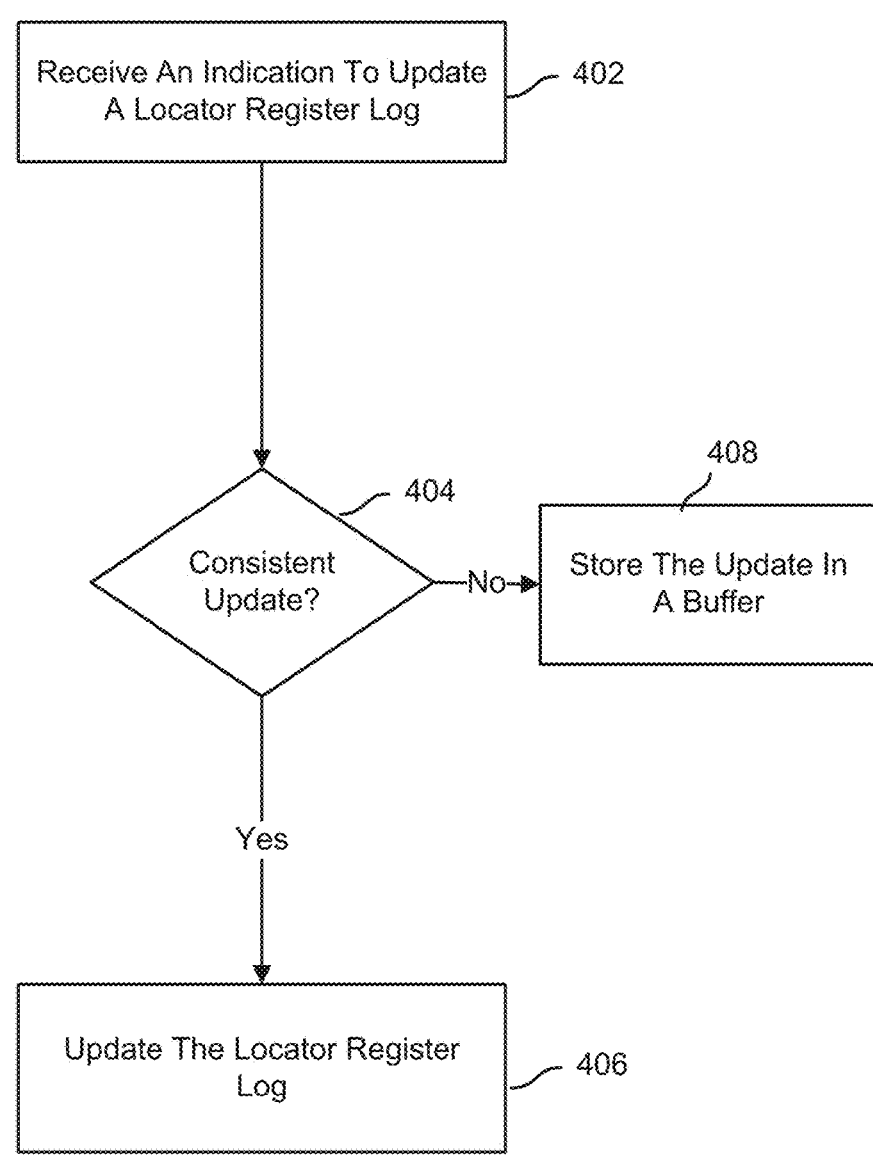
FIG. 4 is a flow diagram illustrating a process for updating a locator register log in accordance with some embodiments.

FIG. 4 is a flow diagram illustrating a process for updating a locator register log in accordance with some embodiments. In the example shown, process 400 may be implemented by a node, such as nodes 113, 115, . . . , 117. In some embodiments, process 400 is implemented to perform some or all of step 208 of process 200 or some or all of step 556 of process 550.

At 402, an indication to update a locator register log is received. The indication may include a log identifier, a log offset, a shard size, and a set of sequence numbers associated with the update. A plurality of nodes may be logging, in parallel, a set and/or a subset of data changes. A first node may finish logging an assigned set and/or an assigned subset of data changes before a second node finishes logging an assigned set and/or an assigned subset of data changes.

At 404, it is determined whether the update is a consistent update. The locator register log may include one or more entries, each entry with a corresponding sequence number. The node determines whether a first sequence number included in the set of sequence numbers associated with the update is the next sequential number after the sequence number associated with a most recent entry of the locator register log.

In response to a determination that the update is a consistent update, process 400 proceeds to 406. For example, the locator register log includes entries for data changes having sequence numbers 1-50 and a first sequence number included in the set of sequence numbers associated with the update is 51.

In response to a determination that the update is not a consistent update, process 400 proceeds to 408. For example, the locator register log includes entries for data changes having sequence numbers 1-50 and a first sequence number included in the set of sequence numbers associated with the update is 101.

At 406, the locator register log is updated. The locator register log may be updated to include one or more entries corresponding to one or more data changes. An entry in the locator register log may map a data log associated with a node, a file offset, a shard size, and a location of the data change within the log associated with the node with a sequence number of the data change.

At 408, the set of sequence numbers associated with the update are stored in a buffer. The locator register log may be updated at a later point in time, i.e., when updating the locator register log with the buffered set of sequence numbers causes the locator register log to remain consistent.

Figure 5A:
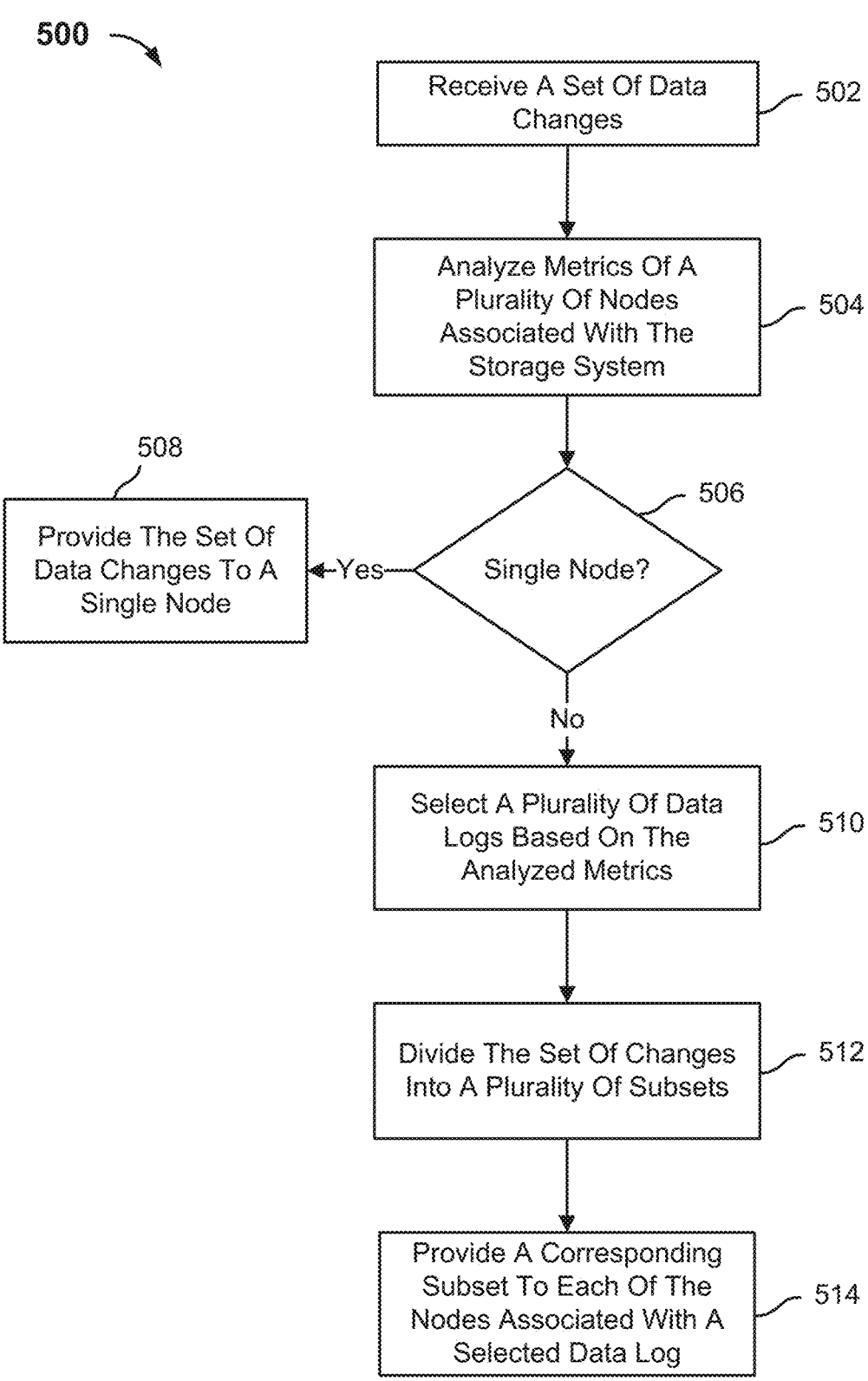
FIG. 5A is a flow diagram illustrating a process for providing continuous data protection in accordance with some embodiments.

FIG. 5A is a flow diagram illustrating a process for providing continuous data protection in accordance with some embodiments. In the example shown, process 500 may be implemented by a controller VM, such as controller VM 106.

At 502, a set of data changes is received. The set of data changes are associated with an epoch. The set of data changes corresponds to one or more write I/Os associated with an object (e.g., VM, database, applications, etc.). The set of data changes may include an associated entity identifier. The associated entity identifier may indicate the object with which the set of data changes is associated (e.g., a VMDK associated with a VM). A data change included in the set of data changes may be a key-value pair. The key may be the entity identifier and the value may be a sequence number. The sequence number is associated with a corresponding write I/O.

At 504, metrics of a plurality of nodes associated with a storage system are analyzed. The metrics of the different nodes associated with the storage system may include ingest queue length, CPU utilization, etc.

At 506, it is determined whether a single node associated with the storage system is capable of ingesting the set of data changes at a particular rate and/or logging the set of data changes in a manner that satisfies a specified RPO and/or RTO. In response to a determination that the specified RPO and/or RTO is able to be satisfied by a single node, process 500 proceeds to 508. For example, a size of the set of data changes may be 100 MB, the node is capable of logging the data changes at a rate of 100 MB/s based on the current metrics of the node, and a specified RPO is 1 second.

In response to a determination that the RPO and/or RTO is unable to be satisfied by a single node, process 500 proceeds to 510. For example, a size of the set of data changes may be 1 GB, the node is capable of logging the data changes at a rate of 100 MB/s based on the current metrics of the node, and a specified RPO may be 1 second.

At 508, the set of data changes is provided to a single node. In some embodiments, one of the nodes associated with the storage system is capable of ingesting the set of data changes at a particular rate and logging the set of data changes in a manner that satisfies a specified RPO and/or RTO. In such embodiments, the set of data changes is provided to the one node.

In some embodiments, at least two of the nodes associated with the storage system are capable of ingesting the set of data changes at a particular rate and logging the set of data changes in a manner that satisfies a specified RPO and/or RTO. In such embodiments, the set of data changes is provided to one of the at least two nodes associated with the storage system that are capable of ingesting the set of data changes at a particular rate and logging the set of data changes in a manner that satisfies a specified RPO and/or RTO.

At 510, a plurality of data logs are selected based on the analyzed metrics. In some embodiments, some of the data logs associated with the plurality of nodes are selected. In some embodiments, all of the data logs associated with the plurality of nodes are selected.

At 512, the set of changes is divided into a plurality of subsets. In some embodiments, the number of subsets is equal to the number of nodes associated with the storage system. In some embodiments, the number of subsets is less than the number of nodes associated with the storage system. In some embodiments, the number of subsets is the number of subsets needed to satisfy the specified RPO and/or RTO.

At 514, a corresponding subset is provided to each of the nodes associated with a selected data log. For example, a first subset may be provided to a first node and a second subset may be provided to a second node.

Figure 5B:
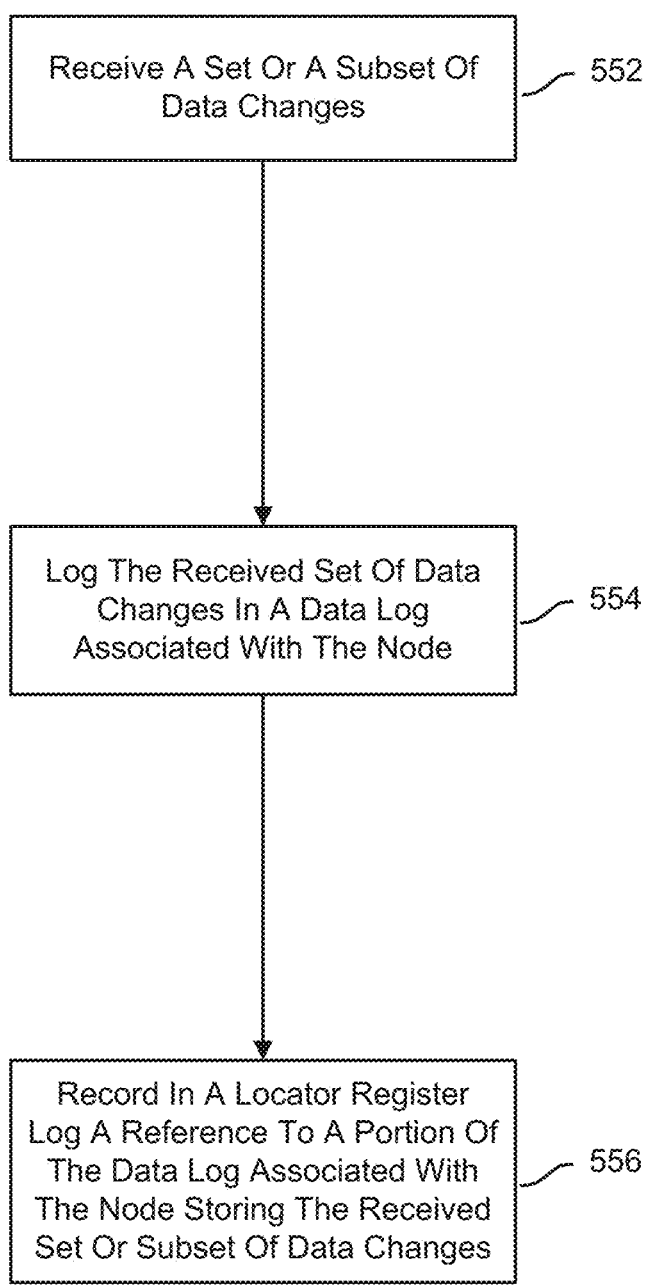
FIG. 5B is a flow diagram illustrating a process for providing continuous data protection in accordance with some embodiments.

FIG. 5B is a flow diagram illustrating a process for providing continuous data protection in accordance with some embodiments. In the example shown, process 550 may be implemented by a node of a storage system, such as nodes 113, 115, . . . , 117.

At 552, a set or a subset of data changes is received. At 554, the received set of data changes is logged in a data log associated with the node. At 556, a reference to a portion of the data log associated with the node storing the received set or subset of data changes is recorded in a locator register log.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a set of data changes to a storage associated with a source system;
   dynamically selecting one or more data logs among a plurality of data logs stored in respective nodes of a storage system based at least in part on a dynamic analysis of metrics of the respective nodes of the storage system; and
   logging at least one data change of the set of data changes in the one or more selected data logs.

2. The method of claim 1, wherein the metrics of the respective nodes of the storage system include one or more of an ingest queue length or a central processing unit (CPU) utilization.

3. The method of claim 1, wherein dynamically selecting the one or more data logs among the plurality of data logs further includes analyzing the metrics of the respective nodes of the storage system.

4. The method of claim 1, wherein dynamically selecting the one or more data logs among the plurality of data logs further comprises determining whether a node that has received the set of data changes is capable of ingesting the set of data changes at a particular rate and/or logging the set of data changes in a manner that satisfies one or more of a specified recovery point objective (RPO) or a specified recovery time objective (RTO).

5. The method of claim 4, wherein logging the data changes in the one or more selected data logs comprises logging the set of data changes in a data log associated with the node that has received the set of data changes based on a determination that the node that has received the set of data changes is capable of one or more of ingesting the set of data changes at the particular rate and/or logging the set of data changes in the manner that satisfies the one or more of the specified RPO or the specified RTO.

6. The method of claim 4, wherein dynamically selecting the one or more data logs among the plurality of data logs comprises selecting the one or more data logs among the plurality of data logs stored in the respective nodes of the storage system based on a determination that at least one node of the nodes of the storage system is not capable of one or more of ingesting the set of data changes at a particular rate or logging the set of data changes in the manner that satisfies the one or more of the specified RPO or the specified RTO.

7. The method of claim 1, wherein the one or more data logs includes the plurality of data logs stored in respective nodes of the storage system.

8. The method of claim 1, wherein the one or more data logs includes a data log associated with the node that has received the set of data changes.

9. The method of claim 1, wherein the one or more data logs excludes a data log associated with the node that has received the set of data changes.

10. The method of claim 1, wherein dynamically selecting the one or more data logs among the plurality of data logs comprises dividing the set of data changes into a plurality of subsets and assigning the subsets to the one or more selected data logs, respectively.

11. The method of claim 10, wherein a number of subsets in the plurality of subsets is selected to satisfy the one or more of a specified recovery point objective (RPO) or a specified recovery time objective (RTO).

12. The method of claim 1, wherein logging the at least one data change of the set of data changes in the one or more selected data logs includes logging the set of data changes.

13. The method of claim 1, wherein logging the at least one data change of the set of data changes in the one or more selected data logs includes logging a subset of the set of data changes.

14. The method of claim 1, further comprising:

receiving an indication to update a locator register log; and recording, based on the indication, in the locator register log a reference to a portion of the one or more selected data logs associated with storing the data changes.

15. The method of claim 14, further comprising:

recording, based on determining an update to a locator register log is a consistent update, in the locator register log a reference to a portion of the one or more selected data logs associated with storing the data changes.

16. The method of claim 14, further comprising:

storing, based on determining an update to a locator register log is an inconsistent update, the update in a buffer.

17. Non-transitory computer readable media comprising instructions that, when executed by one or more processors, cause the one or more processors to:

receive a set of data changes to a storage associated with a source system;

dynamically select one or more data logs among a plurality of data logs stored in respective nodes of a storage system based at least in part on a dynamic analysis of metrics of the respective nodes of the storage system; and log at least one data change of the set of data changes in the one or more selected data logs.

18. The media of claim 17, wherein the metrics of the respective nodes of the storage system include one or more of an ingest queue length or a central processing unit (CPU) utilization.

19. The media of claim 17, wherein to dynamically select the one or more data logs among the plurality of data logs, the instructions cause the one or more processors to determine whether a node that has received the set of data changes is capable of ingesting the set of data changes at a particular rate and/or logging the set of data changes in a manner that satisfies one or more of a specified recovery point objective (RPO) or a specified recovery time objective (RTO).

20. A system, comprising:

memory comprising instructions;

one or more processors having access to the memory, the one or more processors configured to execute the instructions to cause the one or more processors to:

receive a set of data changes to a storage associated with a source system;

dynamically select one or more data logs among a plurality of data logs stored in respective nodes of a storage system based at least in part on a dynamic analysis of metrics of the respective nodes of the storage system; and log at least one data change of the set of data changes in the one or more selected data logs.

* * * * *